United States Patent
Iino et al.

(10) Patent No.: US 11,954,076 B2
(45) Date of Patent: Apr. 9, 2024

(54) HIERARCHICAL STORAGE MANAGEMENT SYSTEM, HIERARCHICAL STORAGE CONTROL APPARATUS, HIERARCHICAL STORAGE MANAGEMENT METHOD AND PROGRAM

(71) Applicant: Nippon Telegraph and Telephone Corporation, Tokyo (JP)

(72) Inventors: Tomonori Iino, Musashino (JP); Atsushi Sakurai, Musashino (JP); Yuriko Tanaka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/629,462

(22) PCT Filed: Jul. 31, 2019

(86) PCT No.: PCT/JP2019/030082
§ 371 (c)(1),
(2) Date: Jan. 24, 2022

(87) PCT Pub. No.: WO2021/019746
PCT Pub. Date: Feb. 4, 2021

(65) Prior Publication Data
US 2022/0222220 A1    Jul. 14, 2022

(51) Int. Cl.
*G06F 17/00* (2019.01)
*G06F 7/00* (2006.01)
*G06F 16/185* (2019.01)

(52) U.S. Cl.
CPC .................. *G06F 16/185* (2019.01)

(58) Field of Classification Search
CPC ...................................................... G06F 16/185
(Continued)

(56) References Cited

U.S. PATENT DOCUMENTS

| 6,330,572 | B1 * | 12/2001 | Sitka | G06F 16/185 |
| | | | | 707/823 |
| 2002/0008250 | A1 * | 1/2002 | Terzioglu | G11C 7/06 |
| | | | | 257/200 |

(Continued)

OTHER PUBLICATIONS

[No Author Listed] [online], "Part 1 Mechanism of CDN (What kind of technology can CDN do?)," Cash shop blog CDN / WEB high-speed blog, May 18, 2015, retrieved from URL <https://blog.redbox.ne.jp/what-is-cdn.html>, 29 pages (with English Translation).

(Continued)

*Primary Examiner* — Pavan Mamillapalli
(74) *Attorney, Agent, or Firm* — Fish & Richardson P.C.

(57) ABSTRACT

In a hierarchical storage management system including: a hierarchical storage that is provided in an individual data center and has at least one storage medium; and a hierarchical storage control apparatus that manages at least one hierarchical storage, the hierarchical storage control apparatus includes a calculation unit that performs processing for obtaining, for individual data managed by the hierarchical storage control apparatus, a storage medium in a data center that satisfies an operation policy by calculating power consumption needed for storing the data, a cost needed for storing the data, and communication time for transferring the data from a data center to a reference source area and by comparing the calculated power consumption, cost, and communication time with the operation policy set for the data.

9 Claims, 21 Drawing Sheets

(58) Field of Classification Search
USPC .......................................................... 707/829
See application file for complete search history.

(56) References Cited

U.S. PATENT DOCUMENTS

| | | | | |
|---|---|---|---|---|
| 2005/0033757 | A1* | 2/2005 | Greenblatt | G06F 16/10 |
| | | | | 707/999.1 |
| 2005/0055519 | A1* | 3/2005 | Stuart | G06F 16/122 |
| | | | | 711/159 |
| 2005/0246386 | A1* | 11/2005 | Sullivan | G06F 3/0605 |
| | | | | 707/999.2 |
| 2006/0069886 | A1* | 3/2006 | Tulyani | G06F 3/0647 |
| | | | | 711/161 |
| 2007/0136397 | A1* | 6/2007 | Pragada | G06F 16/185 |
| | | | | 707/999.204 |
| 2007/0179990 | A1* | 8/2007 | Zimran | G06F 16/185 |
| | | | | 707/999.201 |
| 2007/0250838 | A1* | 10/2007 | Belady | G06F 11/3409 |
| | | | | 714/E11.197 |
| 2009/0144393 | A1* | 6/2009 | Kudo | G06F 9/5044 |
| | | | | 707/999.2 |
| 2010/0325273 | A1* | 12/2010 | Kudo | G06F 9/5044 |
| | | | | 709/224 |
| 2011/0040937 | A1* | 2/2011 | Augenstein | G06F 16/185 |
| | | | | 711/E12.001 |
| 2014/0298349 | A1* | 10/2014 | Jackson | G06F 1/3206 |
| | | | | 718/104 |
| 2020/0026784 | A1* | 1/2020 | Miyoshi | G06F 16/178 |

OTHER PUBLICATIONS

Katsurashima, "Systematic understanding of storage virtualization (4): Understanding automatic storage tiering (1/3)," ITmedia Inc., Jun. 27, 2011, retrieved from URL <https://www.atmarkit.co.jp/ait/articles/1106/27/news109.html>, 7 pages (with English Translation).

Miki et al., "Basic knowledge of storage in the "offensive IT" era, 1st What is Software Defined Storage?" ITmedia Inc., Sep. 29, 2014, retrieved from URL <https://atmarkit.itmedia.co.jp/ait/articles/1409/29/news130.html>, 9 pages (with English Translation).

* cited by examiner

Fig. 5

DATA CENTER INFORMATION TABLE 2210

| DATA CENTER NUMBER | NAME | LOCATION (ADDRESS, LATITUDE/ LONGITUDE) | ELECTRICITY CHARGE PER UNIT [YEN/kWh] | CONSTRUCTION COST PER RACK [YEN/RACK] |
|---|---|---|---|---|
| | | | | |
| | | | | |
| | | | | |

Fig. 6

STORAGE MEDIUM INFORMATION TABLE 2220

| STORAGE MEDIUM NUMBER | READING TIME [byte/s] | CAPACITY [byte] | POWER CONSUMPTION DURING STANDBY [w] | POWER CONSUMPTION DURING READING [w] | LIFETIME [YEAR] | ACQUISITION PRICE [YEN] |
|---|---|---|---|---|---|---|
| 1 | | | | | | |
| 2 | | | | | | |
| 3 | | | | | | |

Fig. 7

(a) TRANSMISSION LINE INFORMATION TABLE 2230

| TRANSMISSION LINE NUMBER | DATA CENTER NUMBER 1 | DATA CENTER NUMBER 2 | COMMUNICATION SPEED [bit/s] |
|---|---|---|---|
| | | | |
| | | | |
| | | | |

(b) CALCULATION INTERVAL TABLE 2240

| CALCULATION INTERVALS |
|---|
| |

(c) EXECUTION LOG TABLE 2250

| NUMBER OF TIMES | CALCULATION EXECUTION DATE AND TIME |
|---|---|
| 1 | |
| 2 | |

Fig. 8

OPERATION POLICY TABLE 2260

| COMMUNICATION SPEED [s] | POWER CONSUMPTION [W] | COST [YEN] | POLICY NUMBER |
|---|---|---|---|
| | | | |
| | | | |
| | | | |

Fig. 9

STORED DATA MANAGEMENT TABLE 2270

| DATA NUMBER | DATA SIZE [byte] | STORAGE MEDIUM NUMBER | NUMBER OF REFERENCE COUNTS [TIME] | MOST FREQUENT REFERENCE SOURCE AREA | POLICY NUMBER | COMMUNICATION SPEED | POWER CONSUMPTION | COST |
|---|---|---|---|---|---|---|---|---|
| | | | | | | | | |
| | | | | | | | | |
| | | | | | | | | |

OUTLINE OF CONFIGURATION DIAGRAM

Fig. 13

DATA CENTER INFORMATION TABLE 2210

| DATA CENTER NUMBER | NAME | LOCATION (ADDRESS, LATITUDE/ LONGITUDE) | ELECTRICITY CHARGE PER UNIT [YEN/kWh] | CONSTRUCTION COST PER RACK [YEN/RACK] |
|---|---|---|---|---|
| 1 | SOUTH KANTO DATA CENTER | XXX, XX-KU, TOKYO-TO | 20 | 2,000,000 |
| 2 | NORTH KANTO DATA CENTER | XXX, XX-SHI, SAITAMA-KEN | 20 | 1,500,000 |
| 3 | JOSHINETSU DATA CENTER | XXX, XX-SHI, NIIGATA-KEN | 15 | 1,000,000 |
| 4 | HOKKAIDO DATA CENTER | XXX, XX-SHI, HOKKAIDO | 10 | 500,000 |

Fig. 14

STORAGE MEDIUM INFORMATION TABLE 2220

| STORAGE MEDIUM NUMBER | DATA CENTER NUMBER | READING TIME [byte/s] | CAPACITY [byte] | POWER CONSUMPTION DURING STANDBY [w] | POWER CONSUMPTION DURING READING [w] | LIFETIME [YEAR] | ACQUISITION PRICE [YEN] | ACQUISITION PRICE PER TB [YEN/(TB,YEAR)] |
|---|---|---|---|---|---|---|---|---|
| | | | | | | | | FOR SUPPLEMENT (INTERMEDIATE VALUE) |
| 01 | 1 | 560 MB | 80 TB | 10 W | 12 W | 4 | 10,000,000 YEN | 31,250 |
| ... | | | | | | | | |
| 11 | 1 | 200 MB | 60 TB | 5 W | 10 W | 6 | 5,000,000 YEN | 13,889 |
| ... | | | | | | | | |
| 21 | 2 | 560 MB | 80 TB | 10 W | 12 W | 4 | 10,000,000 YEN | 31,250 |
| 31 | 2 | 200 MB | 60 TB | 5 W | 10 W | 6 | 5,000,000 YEN | 13,889 |
| ... | | | | | | | | |
| 41 | 3 | 560 MB | 80 TB | 10 W | 12 W | 4 | 10,000,000 YEN | 31,250 |
| ... | | | | | | | | |
| 51 | 3 | 200 MB | 60 TB | 5 W | 10 W | 6 | 5,000,000 YEN | 13,889 |
| ... | | | | | | | | |
| 61 | 4 | 200 MB | 60 TB | 5 W | 10 W | 6 | 5,000,000 YEN | 13,889 |
| ... | | | | | | | | |
| 71 | 4 | 300 MB +30 S | 480 TB | 0 W | 150 W | 20 | 15,000,000 YEN | 1,563 |
| ... | | | | | | | | |

Fig. 15

(a) TRANSMISSION LINE INFORMATION TABLE 2230

| TRANSMISSION LINE NUMBER | SECTION | | COMMUNICATION SPEED [bit/s] |
|---|---|---|---|
| | FROM | TO | |
| 1 | SOUTH KANTO DATA CENTER | JOSHINETSU DATA CENTER | 100 GBPS |
| 2 | SOUTH KANTO DATA CENTER | HOKKAIDO DATA CENTER | 20 GBPS |
| 3 | SOUTH KANTO DATA CENTER | EXTERNAL NETWORK | 100 GPS |
| 4 | EXTERNAL DATA CENTER | NORTH KANTO DATA CENTER | 100 GBPS |

(b) CALCULATION INTERVAL TABLE 2240

| CALCULATION INTERVALS |
|---|
| ONE MONTH |

(c) EXECUTION LOG TABLE 2250

| NUMBER OF TIMES | CALCULATION EXECUTION DATE AND TIME |
|---|---|
| 1 | 5/1/2019 01:00 |
| 2 | 4/1/2019 01:00 |
| 3 | 3/1/2019 01:00 |
| 4 | 2/1/2019 01:00 |

Fig. 16

OPERATION POLICY TABLE 2260

| COMMUNICATION SPEED [s] | POWER CONSUMPTION [W] | COST [YEN] | POLICY NUMBER | FOR EXAMPLE, |
|---|---|---|---|---|
| 1 | N/A | N/A | 1 | → DATA FOR WHICH LATENCY IS NOT ALLOWED |
| N/A | 5 | N/A | 2 | → DATA FOR WHICH POWER CONSUMPTION AND ENVIRONMENT NEED TO BE CONSIDERED |
| N/A | N/A | 1000 | 3 | → DATA FOR WHICH LOW STORAGE COST IS PRIORITY |
| 3600 | 100 | 2000 | 4 | |
| 2000 | 500 | 10000 | 5 | |
| | | | | |
| | | | | |

Fig. 17

STORED DATA MANAGEMENT TABLE 2270

| DATA NUMBER | DATA SIZE [byte] | STORAGE MEDIUM NUMBER | NUMBER OF REFERENCE COUNTS [TIME] | MOST FREQUENT REFERENCE SOURCE AREA | POLICY NUMBER | COMMUNICATION SPEED | POWER CONSUMPTION | COST |
|---|---|---|---|---|---|---|---|---|
| 1 | 300 GB | 21 | 200 | HOKKAIDO | 5 | | | |
| 2 | 1 TB | 11 | 20 | SOUTH KANTO | 4 | colspan BLANK FROM UPLOADING TO FIRST CALCULATION | | |
| 3 | 500 MB | 71 | 1000 | SOUTH KANTO | 1 | | | |
| ... | | | | | | | | |

Fig. 19

$$C_{year} = PU_{year} \times Charge_{power} + \frac{Charge_{footprint} \times Size_{data}}{Density_{storage}} + \frac{Charge_{media} \times Size_{data}}{Capacity_{media} \times Lifetime_{media}}$$

$$PU_{year} \times Charge_{power} = 730[Wh] \times 20 \left[\frac{YEN}{Wh}\right] = 14600[YEN]$$

$$\frac{Charge_{footprint} \times Size_{data}}{Density_{storage}} = \frac{2,000,000/2 \times 1T}{60T} = 16667[YEN]$$

CONSTRUCTION COST PER RACK

TWO STORAGES INSTALLED IN ONE RACK $$\frac{Charge_{media} \times Size_{data}}{Capacity_{media} \times Lifetime_{media}} = \frac{5,000,000 \times 1T}{60T \times 4} = 20833[YEN]$$

$$C_{year} = 14,600 + 16,667 + 20,833 = 52,100[YEN]$$

Fig. 21

| DATA NUMBER | DATA SIZE [byte] | STORAGE MEDIUM NUMBER | NUMBER OF REFERENCE COUNTS [TIME] | MOST FREQUENT REFERENCE SOURCE AREA | POLICY NUMBER | COMMUNICATION SPEED | POWER CONSUMPTION | COST |
|---|---|---|---|---|---|---|---|---|
| 2 | 1 TB | 11 | 20 | SOUTH KANTO | 4 | 5000 | 730 | 52100 |

AFTER CALCULATION, STORE AND COMPARE WITH POLICY NUMBER "4" IN OPERATION POLICY TABLE

HIERARCHICAL STORAGE MANAGEMENT SYSTEM, HIERARCHICAL STORAGE CONTROL APPARATUS, HIERARCHICAL STORAGE MANAGEMENT METHOD AND PROGRAM

CROSS-REFERENCE TO RELATED APPLICATIONS

This application is a National Stage application under 35 U.S.C. § 371 of International Application No. PCT/JP2019/030082, having an International Filing Date of Jul. 31, 2019. The disclosure of the prior application is considered part of the disclosure of this application, and is incorporated in its entirety into this application.

TECHNICAL FIELD

The present invention relates to a technique for optimizing data storage and operation by arranging data stored in a plurality of data centers based on conditions determined by a business operator.

BACKGROUND ART

A conventional hierarchical storage management system has large-capacity storage configured by using SSDs, HDDs, and magnetic tapes in accordance with the number of reference counts made to stored data and the access speed (write, read) of a storage medium. Data having the high number of reference counts is automatically stored in an SSD to achieve a higher access speed (Non Patent Literature 1).

In addition, there is a content distribution system that can shorten download time by providing a content cache server at the boundary between a user area and a public network and downloading a content from the cache server close to an accessing user (Non Patent Literature 2).

Furthermore, thin clients, software-defined storage employing virtualization, etc. have become widespread, and data is managed in data centers without ensuring storage in client terminals of the users (Non Patent Literature 3).

CITATION LIST

Non Patent Literature

[NPL 1] https://www.atmarkit.co.jp/ait/articles/1106/27/news109.html
[NPL 2] https://blog.redbox.ne.jp/what-is-cdn.html
[NPL 3] https://www.atmarkit.co.jp/ait/articles/1409/29/news130.htm

SUMMARY OF THE INVENTION

Technical Problem

In recent year, instead of holding and managing software, data, etc. in computer hardware, users have come to manage software, data, etc. on a server in a data center connected to a network, and with the increasing capacity and speed of communication networks, the spread of SNS, the revision of the Electronic Document Law, etc., there has been an increasing demand for storing large volumes of data with different purposes on the network.

Accordingly, a large amount of data of various sizes is stored in the data center for an extended period of time. Among various types of data, there is data for which delay is not allowed, data for which delay is allowed but power consumption and costs need to be reduced, etc. However, to store each of the data having such various operation policies in an appropriate storage medium, the processing needs to be performed manually in the prior art, and thus takes a great deal of time and effort.

The present invention has been made with the foregoing in view, and it is an object to provide a technique capable of automatically selecting a storage medium that matches an operation policy of data from a plurality of storage media disposed in a plurality of data centers.

Means for Solving the Problem

According to the disclosed technique, there is provided a hierarchical storage management system including: a hierarchical storage that is provided in an individual data center and has at least one storage medium; and a hierarchical storage control apparatus that manages at least one hierarchical storage, wherein the hierarchical storage control apparatus includes a calculation unit that performs processing for obtaining, for individual data managed by the hierarchical storage control apparatus, a storage medium in a data center that satisfies an operation policy by calculating power consumption needed for storing the data, a cost needed for storing the data, and communication time for transferring the data from a data center to a reference source area and by comparing the calculated power consumption, cost, and communication time with the operation policy set for the data.

Effects of the Invention

According to the disclosed technique, there is provided a technique capable of automatically selecting a storage medium that matches an operation policy of data from a plurality of storage media disposed in a plurality of data centers.

BRIEF DESCRIPTION OF DRAWINGS

FIG. 5 is diagram illustrating a structure of a data center information table.
FIG. 6 is a diagram illustrating a structure of a storage medium information table.
FIGS. 7(a) to 7(c) are diagrams illustrating structures of various tables.
FIG. 8 is a diagram illustrating a structure of an operation policy table.
FIG. 9 is a diagram illustrating a structure of a stored data management table.
FIG. 13 is a diagram illustrating data center information table according to the embodiment.

FIG. 14 is a diagram illustrating a storage medium information table according to the embodiment.

FIGS. 15(a) to 15(c) are diagrams illustrating various tables according to the embodiment.

FIG. 16 is a diagram illustrating an operation policy table according to the embodiment.

FIG. 17 is a diagram illustrating a stored data management table according to the embodiment.

FIG. 19 is a diagram illustrating a calculation example.

FIG. 21 is a diagram illustrating a calculate result.

DESCRIPTION OF EMBODIMENTS

Hereinafter, an embodiment of the present invention (the present embodiment) will be described with reference to the drawings. The embodiment described below is merely an example. An embodiment to which the present invention is applied is not limited to the following embodiment.

The present embodiment describes a technique for automatically selecting, for individual data to be stored in a plurality of data centers, a storage medium that matches an operation policy of the data, by referring to the location conditions (construction cost, electricity charges), the data reference frequency and the communication speed of the network, and the type of the storage medium storing the data and the installation location of the storage medium. This technique reduces unnecessary power consumption and a cost and contributes to reductions of the power consumption (improvement in energy-saving properties) and the cost in a cloud-type data center and a virtualized NW as well as to improvement of QoS. Hereinafter, the technique will be specifically described.

(Overall System Configuration)

Figure 1:
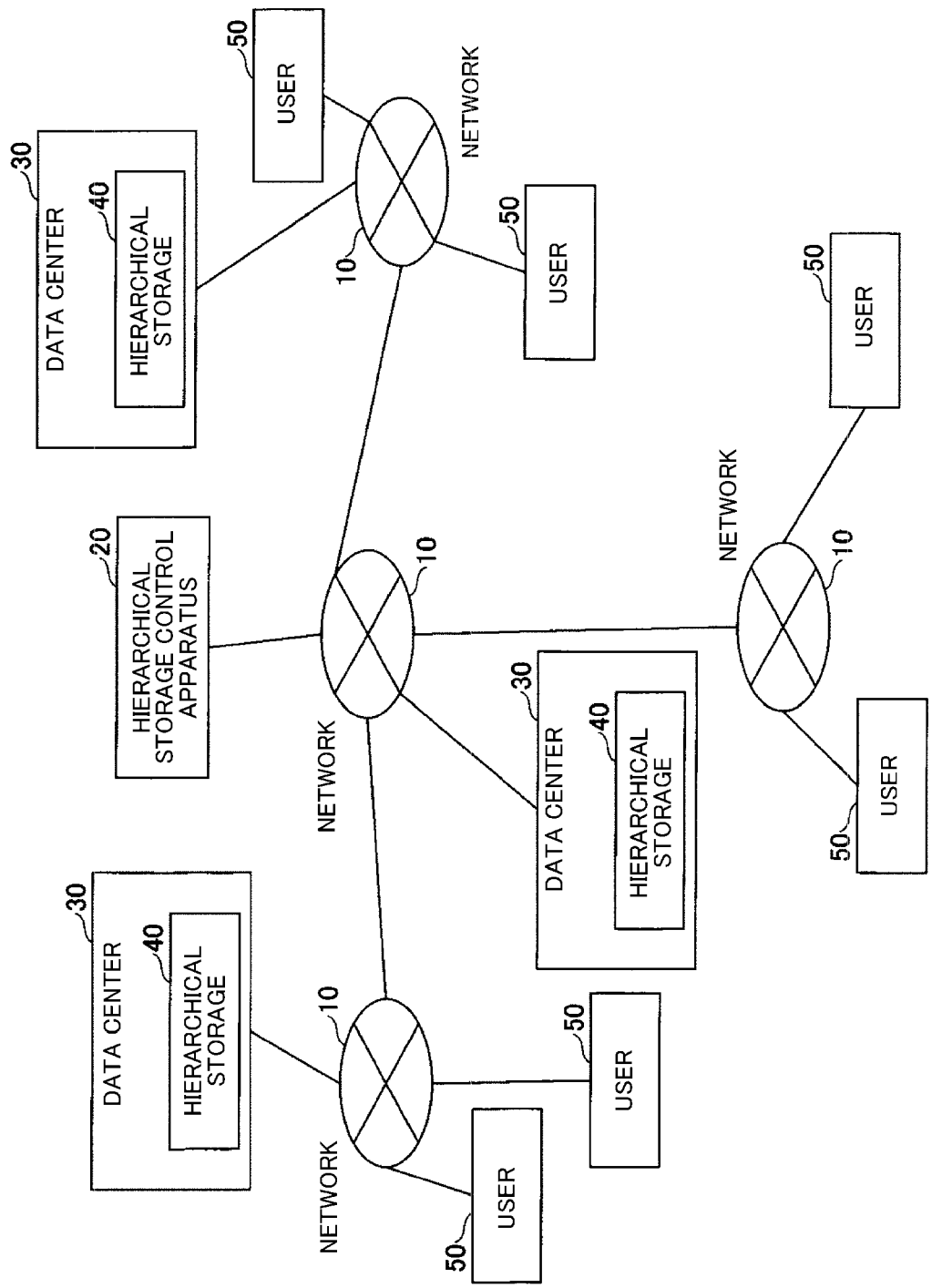
FIG. 1 illustrates a configuration of a hierarchical storage management system.

FIG. 1 illustrates a configuration of a hierarchical storage management system according to the present embodiment. As illustrated in FIG. 1, the hierarchical storage management system according to the present embodiment includes a hierarchical storage control apparatus 20 and a plurality of data centers 30 each connected to a network 10. In addition, a user 50 is connected to the network 10. The "user 50" is, for example, a client terminal used by a user.

As illustrated in FIG. 1, a hierarchical storage 40 is disposed in each of the data centers 30. A data center operator or a CDN operator stores its own data or data of the user 50 in the hierarchical storage 40 disposed in any one of the data centers 30.

The hierarchical storage 40 in the plurality of data centers 30 and the hierarchical storage control apparatus 20 are connected via at least one network 10 so that large-scale storage can be provided.

For example, a storage medium of the hierarchical storage 40 in the data center 30 located near an urban area where the land price is high is configured mainly by a high-speed storage medium such as an SSD and stores data that has a high reference frequency and requires a short delay time. In contrast, a storage medium of the hierarchical storage 40 in the data center 30 located in a suburban area where the land price is low is configured mainly by a plurality of storage media with a low speed such as a magnetic tape to achieve an ultra-high capacity and stores data that has a low reference frequency and allows delay.

When the user 50 refers to data, the data is downloaded from the hierarchical storage 40 in which the data is stored to the user 50.

(Configuration of Hierarchical Storage 40)

Figure 2:
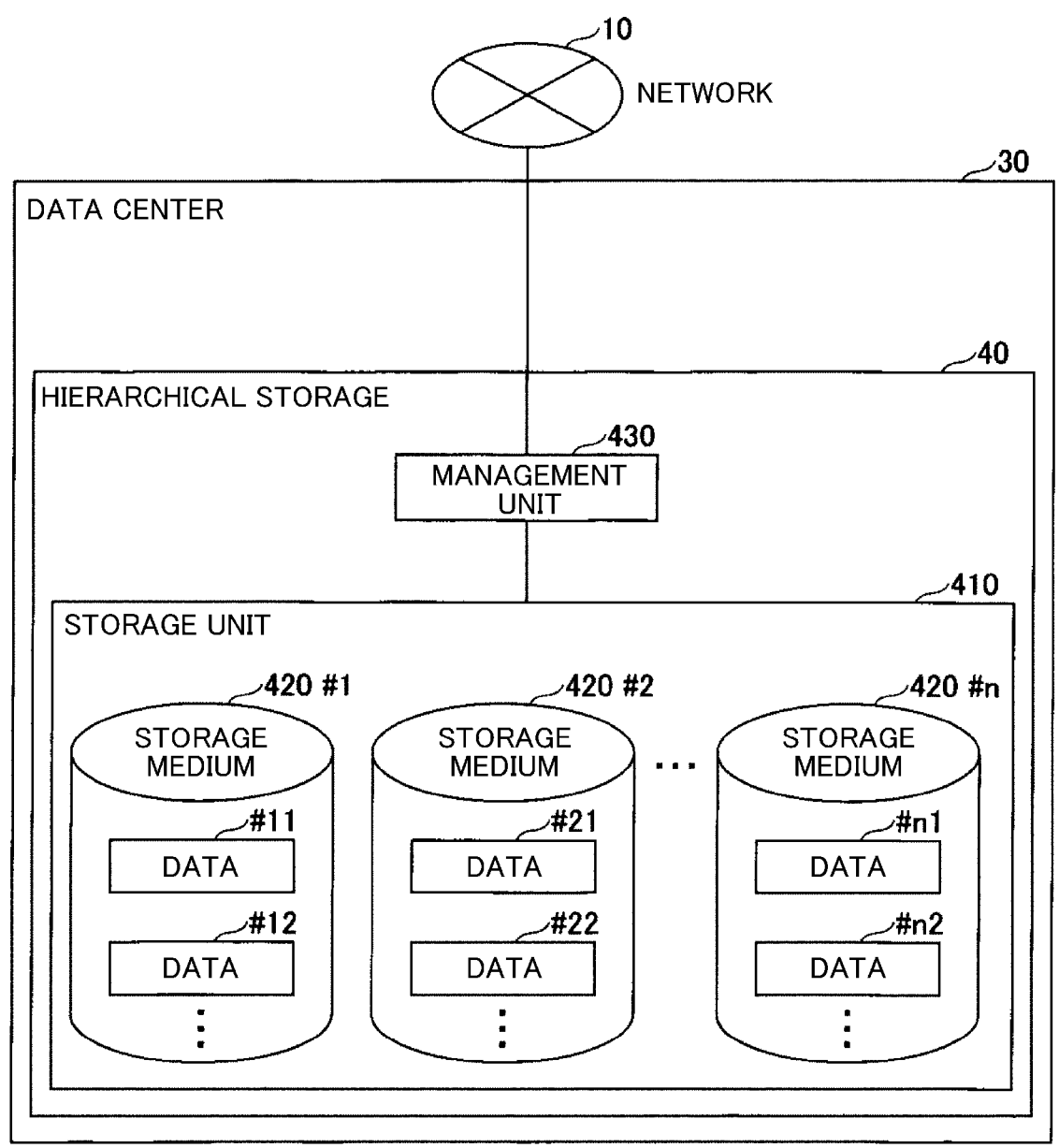
FIG. 2 illustrates a configuration of a hierarchical storage.

FIG. 2 illustrates a configuration of the hierarchical storage 40 disposed in the data center 30. As illustrated in FIG. 2, the hierarchical storage 40 includes a storage unit 410, constituted of a plurality of storage media 420 #1 to 420 #n, and a management unit 430.

The individual storage medium 420 is, for example, an SSD (flash memory), an HDD (magnetic disk), an optical disk, a magnetic tape, or the like. The management unit 430 checks the input and output of data and detects a reference source area and the number of cumulative reference counts when stored data is referred to. The detected information is notified to the hierarchical storage control apparatus 20 and managed therein.

(Configuration of Hierarchical Storage Control Apparatus 20)

Figure 3:
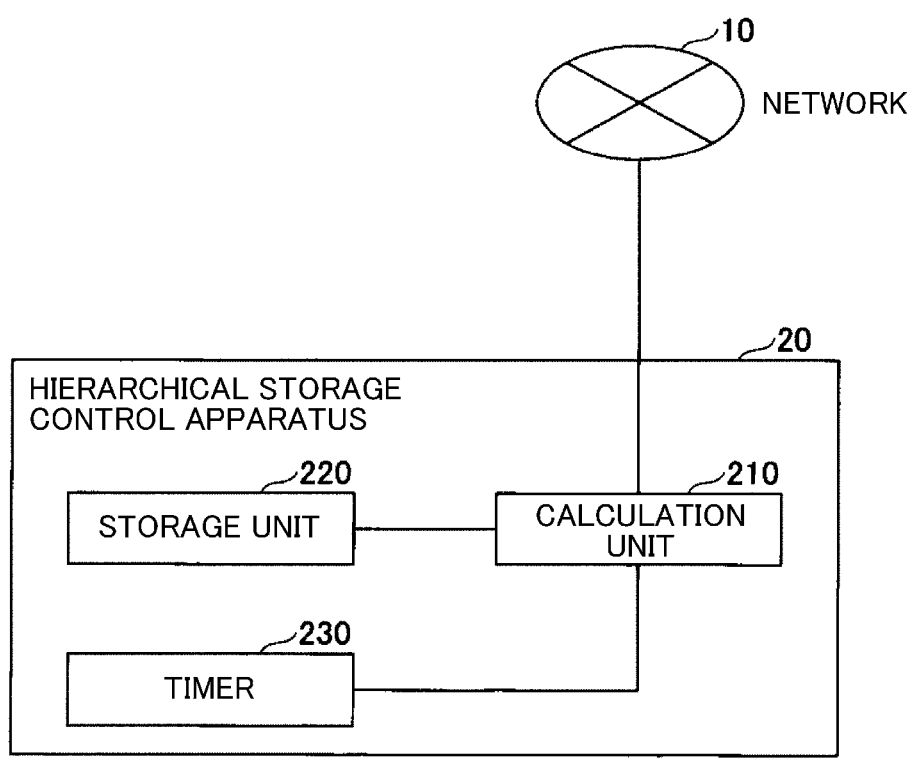
FIG. 3 illustrates a configuration a hierarchical side storage control apparatus.

FIG. 3 illustrates a configuration of the hierarchical storage control apparatus 20. As illustrated in FIG. 3, the hierarchical storage control apparatus 20 includes a calculation unit 210, a storage unit 220, and a timer 230.

The storage unit 220 stores a data center information table 2210, a storage medium information table 2220, a transmission line information table 2230, a calculation interval table 2240, an execution log table 2250, an operation policy table 2260, and a stored data management table 2270.

The timer 230 holds current date and time. The content of each table and the content of calculation performed by the calculation unit 210 will be described below.

(Hardware Configuration Example)

The functions of the hierarchical storage control apparatus 20 can be implemented, for example, by causing a computer to execute a program.

That is, the functions of the hierarchical storage control apparatus 20 can be implemented by executing a program corresponding to processing performed by the hierarchical storage control apparatus 20 by using hardware resources such as a CPU and a memory built in a computer. The above program can be recorded on a computer-readable recording medium (portable memory or the like) to be stored or distributed. In addition, the above program can be provided through a network such as the Internet or e-mail.

Figure 4:
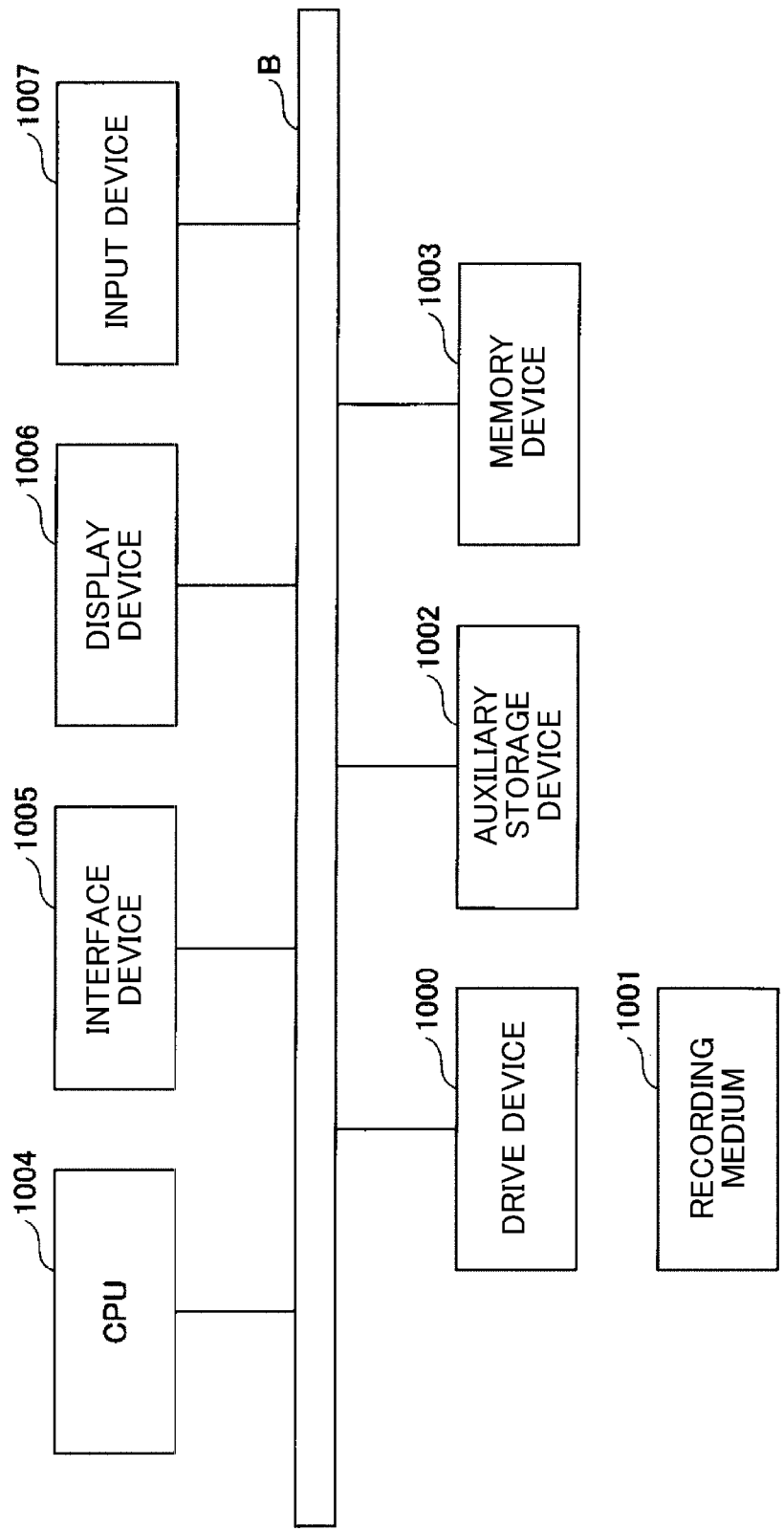
FIG. 4 is a diagram illustrating an example of a hardware configuration of the apparatus.

FIG. 4 is a diagram illustrating an example of a hardware configuration of the above computer. The computer illustrated in FIG. 4 includes a drive device 1000, an auxiliary storage device 1002, a memory device 1003, a CPU 1004, an interface device 1005, a display device 1006, an input device 1007, etc. connected to each other by a bus B.

The program for implementing the processing by the computer is provided, for example, by a recording medium 1001 such as a CD-ROM, a memory card, or the like. When the recording medium 1001 storing the program is set in the drive device 1000, the program is installed in the auxiliary storage device 1002 from the recording medium 1001 via the drive device 1000. However, the program does not necessarily need to be installed from the recording medium 1001 and may be downloaded from another computer via the network. The auxiliary storage device 1002 stores the installed program and also stores necessary files, data, etc.

When the program is instructed to start, the memory device 1003 reads and stores the program from the auxiliary storage device 1002. The CPU 1004 implements the functions of the hierarchical storage control apparatus 20 in accordance with the program stored in the memory device 1003. The interface device 1005 is used as an interface for connecting to a network and functions as input means and output means via the network. The display device 1006 displays a GUI (graphical user interface) or the like in accordance with the program. The input device 157 includes a keyboard, a mouse, buttons, a touch panel, or the like and is used to input various operation instructions.

(Description of Tables)

Next, the tables stored in the storage unit 220 of the hierarchical storage control apparatus 20 will be described.

FIG. 5 illustrates a structure of the data center information table 2210. As illustrated in FIG. 5, the data center information table 2210 stores the unique number, name, and location (address or latitude/longitude) of a data center included in the present hierarchical storage management system, the unit price of the electricity charge of the power supplied to the data center, and the construction cost per rack. Each information item is input manually by an administrator or automatically when the hierarchical storage 40 is newly added to (or eliminated from) the present hierarchical storage management system or when any one of the information items is changed.

FIG. 6 illustrates a structure of the storage medium information table 2220. As illustrated in FIG. 6, the storage medium information table 2220 stores the unique number assigned to the storage medium 420 by the hierarchical storage control apparatus 20, reading time, capacity, power consumption during standby and during reading, lifetime, acquisition price, etc. Each information item is input manually by an administrator or automatically when the storage medium is newly added (or eliminated) or when any one of the information items is changed.

FIG. 7(*a*) illustrates a structure of the transmission line information table 2230. As illustrated in FIG. 7(*a*), the transmission line information table 2230 stores the unique number assigned by the present hierarchical storage management system to an individual transmission line connecting between the data centers 30, the data center numbers of the data centers located at both ends of the transmission line, and the communication speed of the transmission line. Each information item is input manually by an administrator or automatically when a new transmission line is established or when any one of the information items is changed. The transmission line may be a dedicated line for the operator of the hierarchical storage management system or a public line.

FIG. 7(*b*) illustrates a structure of the calculation interval table 2240. As illustrated in FIG. 7(*b*), the calculation interval table 2240 stores intervals (for example, one year, one month) for the calculation determined by the data center operator or the administrator to be performed periodically. The calculation interval is updated when the administrator performs an input to the hierarchical storage management system.

FIG. 7(*c*) illustrates a structure of the execution log table 2250. As illustrated in FIG. 7(*c*), the execution log table 2250 stores the calculation execution date and time in the past.

FIG. 8 illustrates a structure of the operation policy table 2260. As illustrated in FIG. 8, the operation policy table 2260 stores the operation policy of the present hierarchical storage management system. The data center operator or the administrator determines the rank of the delay time, power consumption, and cost, and stores these information items in association with a corresponding policy number.

FIG. 9 illustrates a structure of the stored data management table 2270. As illustrated in FIG. 9, the stored data management table 2270 manages all the data stored in the present hierarchical storage management system in cooperation with the management unit 430 of the hierarchical storage 40 in each of the data centers 30. When new data is stored in the recording medium 420 in the storage unit 410, a record is added to the stored data management table 2270 to record the data number of the data, data size, number of the storage medium storing the data, the number of reference counts, most frequent reference source area, policy number freely set by the administrator, and the communication speed, power consumption, and cost obtained by the calculation, which will be described below, are recorded.

(Processing Operation of Hierarchical Storage Control Apparatus 20)

Hereinafter, the details of the calculation processing performed by the calculation unit 210 of the hierarchical storage control apparatus 20 will be described with reference to a flowchart in FIG. 10.

The calculation unit 210 compares the latest calculation execution date and time in the execution log table 2250 with the date and time of the timer 230, and when the calculation interval stored in the calculation interval table 2240 has elapsed, the calculation unit 210 starts a calculation. In addition, the calculation unit 210 stores the data and time when the calculation is started in the execution log table 2250.

Figure 10:
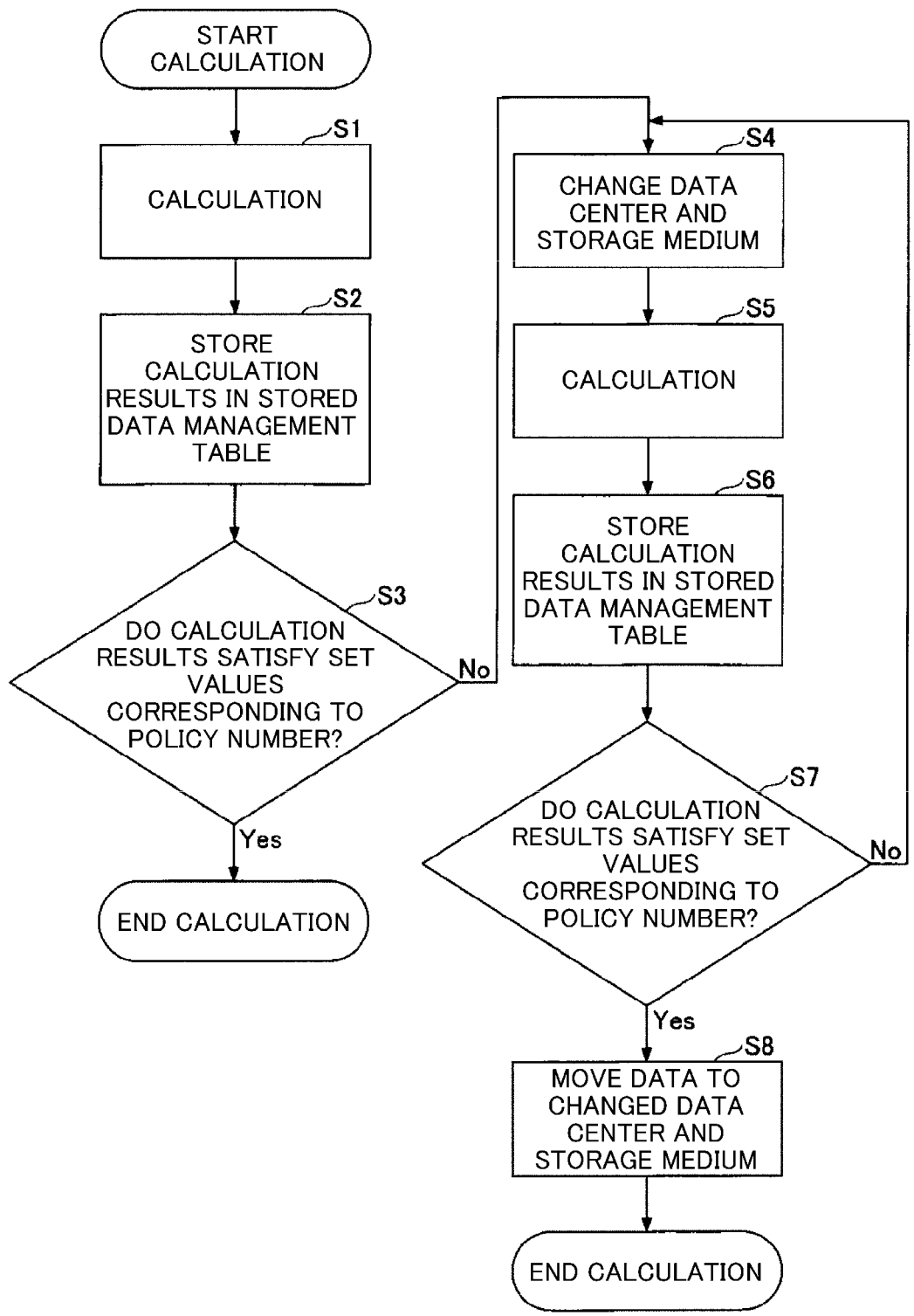
FIG. 10 is a flowchart illustrating calculation performed by a hierarchical storage control apparatus.

In S1 (step 1) in FIG. 10, the calculation unit 210 performs the following processing for each of all the data managed in the stored data management table 2270: the calculation unit 210 calculates the annual power consumption needed for storing the data by using the following formula (1), calculates the annual cost needed for storing the data by using the following formula (2), and calculates the communication speed from the data center storing the data to the most frequent reference source area by using the following formula (3). Since time needed for reading and transmitting data is used as the communication speed in the present embodiment, the communication speed may be referred to as communication time instead. In addition, while the annual value is used in the present example, a value for a period other than one year may be used.

$$PU_{year} = T_{read} \times F_{read} \times P_{read} + (8760 - T_{read} \times F_{read}) \times P_{idle} \quad \text{formula (1)}$$

$PU_{year}$: annual data storage power consumption
$T_{read}$: reading time
$F_{read}$: reference frequency
$P_{read}$: power consumption during reading
$P_{idle}$: power consumption during standby $$C_{year} = PU_{year} \times \text{Charge}_{power} + (\text{Charge}_{foorprint} \times \text{Size}_{data}) \div \text{Density}_{storage} + (\text{Charge}_{media} \times \text{Size}_{data}) \div (\text{Capacity}_{media} \times \text{Lifetime}_{media}) \quad \text{formula (2)}$$

$C_{year}$: annual data storage cost
$PU_{year}$: data storage power consumption
$\text{Charge}_{power}$: electricity charge
$\text{Charge}_{foorprint}$: space cost
$\text{Size}_{data}$: data size
$\text{Density}_{storage}$: storage medium recording density
$\text{Charge}_{media}$: unit price of the storage medium
$\text{Capacity}_{media}$: capacity of the storage medium
$\text{Lifetime}_{media}$: lifetime of the storage medium $$T_{DL} = T_{read} + T_1 \quad \text{formula (3)}$$

$T_{EL}$: data download time from the data center to the reference source
$T_{read}$: reading time
$T_1$: communication speed (communication time) of the NW In S2, the calculation unit 210 stores the annual power consumption, the annual cost, and the communication speed from the data center to the most frequent reference source area, which have been calculated in S1, in the stored data management table 2270 per data.

In the present example, first, the power consumption, the cost, and the communication speed are calculated for each of all the data, and subsequently, determination, etc. in S3, which will be described below, are performed. Alternatively, however, repetitive processing of "calculation, determination, change" (until the operation policy is satisfied) per data may be performed.

In S3, the calculation unit 210 compares the resultant values (the annual power consumption, the annual storage cost, and the communication speed) calculated in S1 with values set for the policy number corresponding to the data in the operation policy table 2260 per data and determines whether all the values satisfy the corresponding values of the operation policy. When all the values of all the data satisfy the corresponding values in the respective operation policies, the processing ends.

When there is one or more data having the value that does not satisfy the value of the corresponding operation policy, the processing of S4 through S8 is performed on each of the one or more data.

In S4, the data center base and the storage medium corresponding to the data are changed. Alternatively, the data center base may not be changed, and only the storage medium may be changed. How the change is performed is not particularly limited. For example, the change may be made by increasing (or decreasing) the data center number/storage medium number. After the change has been made, the calculation is performed on the assumption that the data is stored in a changed storage medium.

The processing of S4 through S7 is then repeated until the determination in S7 (the same determination as in S4) becomes Yes. The content of the calculation in S5 is the same as that in S1.

When the determination in S7 becomes Yes (when the operation policy is satisfied), the calculation unit 210 transfers the data to the storage medium of the data center at that time. The transfer of data from one data center to another data center can be implemented by instructing the management unit 430 of the hierarchical storage 40 in the relevant data center.

EXAMPLE

Figure 11:
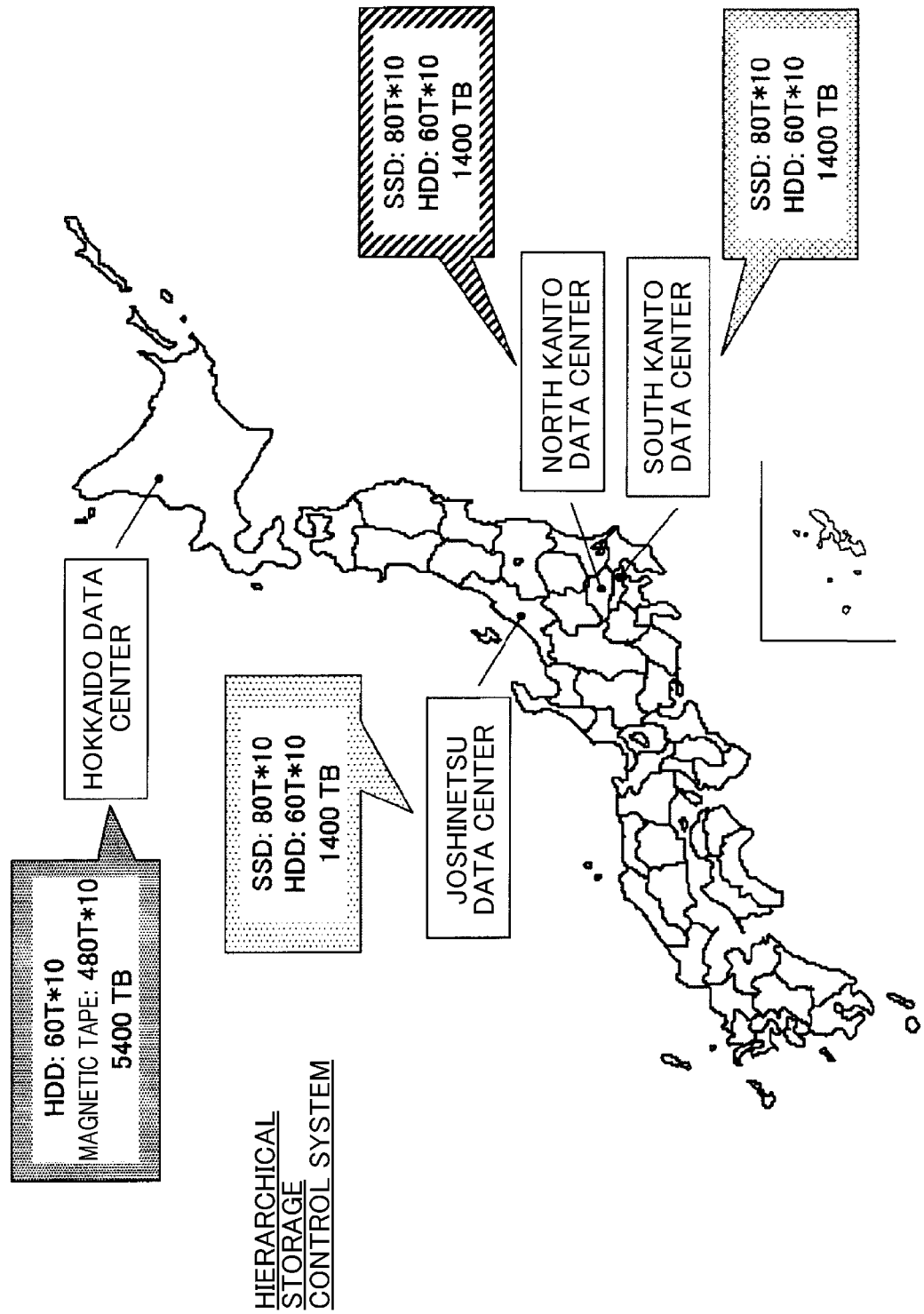
FIG. 11 is a diagram illustrating a data center arrangement according to an embodiment.

Hereinafter, an example will be described as a more specific example. FIG. 11 illustrates the locations of the data centers in the present example. As illustrated in FIG. 11, four data centers (South Kanto, North Kanto, Joshinetsu, Hokkaido) are located in the eastern Japan area.

Figure 12:
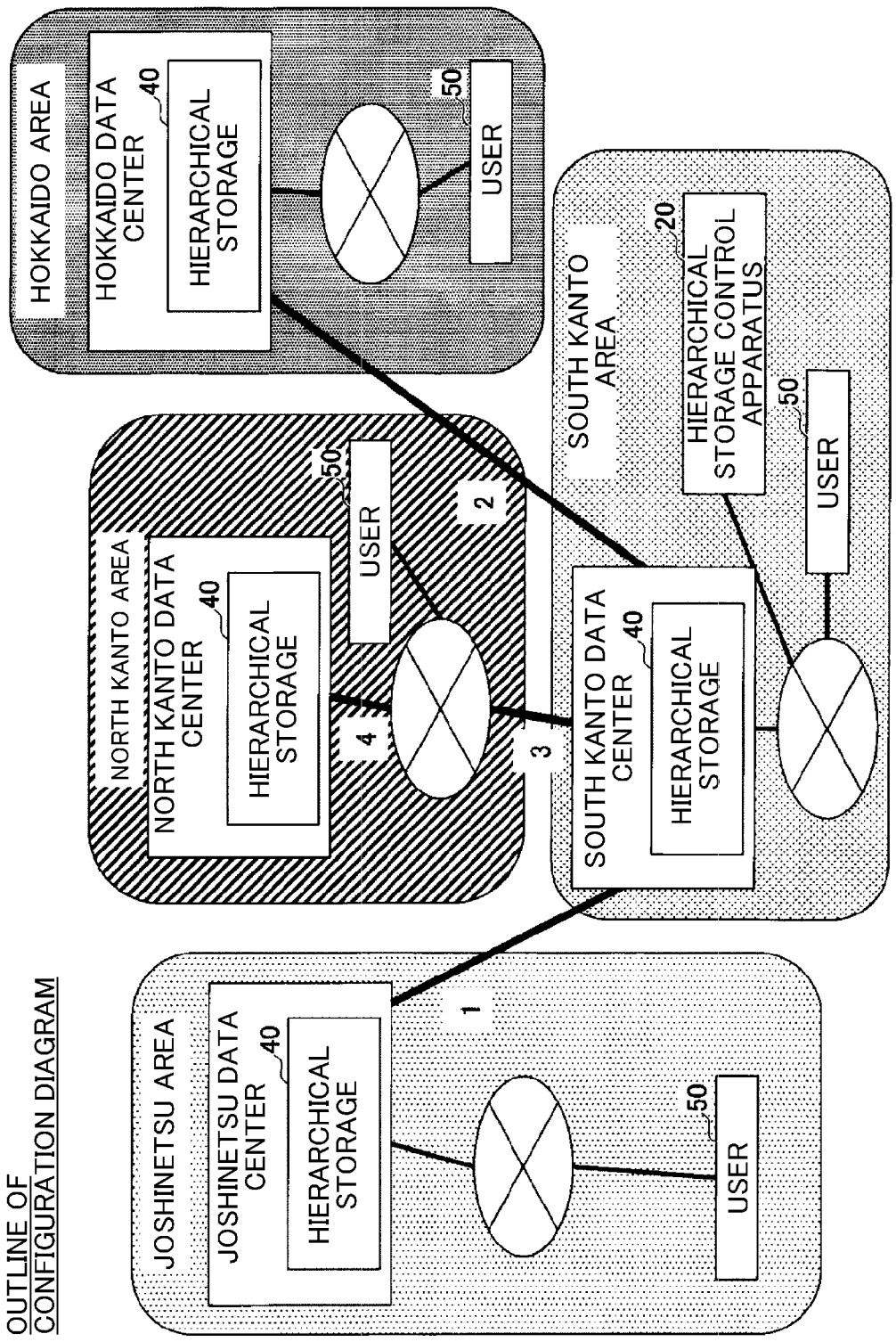
FIG. 12 illustrates a configuration of a hierarchical storage control system according to the embodiment.

FIG. 12 illustrates a configuration of the hierarchical storage management system of the present example. As illustrated in FIG. 12, each data center is provided with the hierarchical storage 40. A configuration of a storage medium in the individual hierarchical storage 40 is as illustrated in FIG. 11. In the present example, the hierarchical storage control apparatus 20 is provided in the South Kanto area. The hierarchical storage control apparatus 20 is connected to each data center via a public network.

FIG. 13 illustrates the data center information table 2210 of the present example. As illustrated in FIG. 13, the data center information table 2210 stores the name, location, unit price of the electricity charge, and construction cost per rack of each data center. The construction cost per rack is a value obtained by dividing the number of accommodated racks by the total construction cost.

FIG. 14 illustrates the storage medium information table 2220 of the present example. As illustrated in FIG. 14, the storage medium information table 2220 stores information about the storage accommodated in each data center.

FIG. 15(a) illustrates the transmission line information table 2230 of the present example. The transmission line number in the transmission line information table 2230 in FIG. 15(a) corresponds to a number assigned to the individual transmission line in FIG. 12.

In the present example, with respect to the South Kanto, the South Kanto and Joshinetsu are connected by a dedicated line, and the South Kanto and Hokkaido are also connected by a dedicated line. The South Kanto and the North Kanto are connected via a public network, instead of a dedicated line. Alternatively, the data centers may be directly connected to one another by a dedicated line or may be connected via a public network.

FIG. 15(b) illustrates the calculation interval table 2240 of the present example. In the present example, the hierarchical storage control apparatus 20 performs the calculation and rearranges the stored data at intervals of one month. Thus, the calculation interval stored in the calculation interval table 2240 is set to one month.

FIG. 15(c) illustrates the execution log table 2250 of the present example. As described above, the execution log table 2250 stores the calculation time in the past. In the present example, the calculation is performed on the first of every month.

FIG. 16 illustrates the operation policy table 2260 of the present example. The business operator determines a communication speed (communication time) needed for downloading the data, power consumption needed for storing the data, and a cost based on the construction cost, the acquisition price of the storage, the electricity charge, etc. and assigns an operation policy number to each operation policy in the operation policy table 2260.

For example, as an operation policy assuming data for which latency is not allowed, achieving low delay regardless of the power consumption or the cost is set as a condition of policy number "1". In addition, for example, as an operation policy assuming a large amount of data having a low reference frequency, having the smallest cost is set as a condition of policy number "3".

Hereinafter, an example of the detailed processing performed by the calculation unit 210 of the present example will be described.

First, it is assumed that data is uploaded as illustrated in the stored data management table 2270 in FIG. 17. That is, the following example case will be considered: data having a data size of 300 GB is stored in the SSD "21" of the North Kanto data center as data number 1, data of 1 TB is stored in the HDD "11" of the South Kanto data center as data number 2, and data of 500 MB is stored in the magnetic tape "71" of Hokkaido data center as data number 3.

The users who have uploaded the above data have set policy numbers 5, 4, and 1 to the data number 1, 2, and 3, respectively. In addition, the number of reference counts and the most frequent reference source areas at the time when the first calculation is performed are as illustrated in FIG. 17.

The calculation described with reference to the flowchart in FIG. 10 starts on the first day of the following month of the data storage. In the present example, the calculation performed for the data of the data number "2" will be described as an example.

Figure 18:
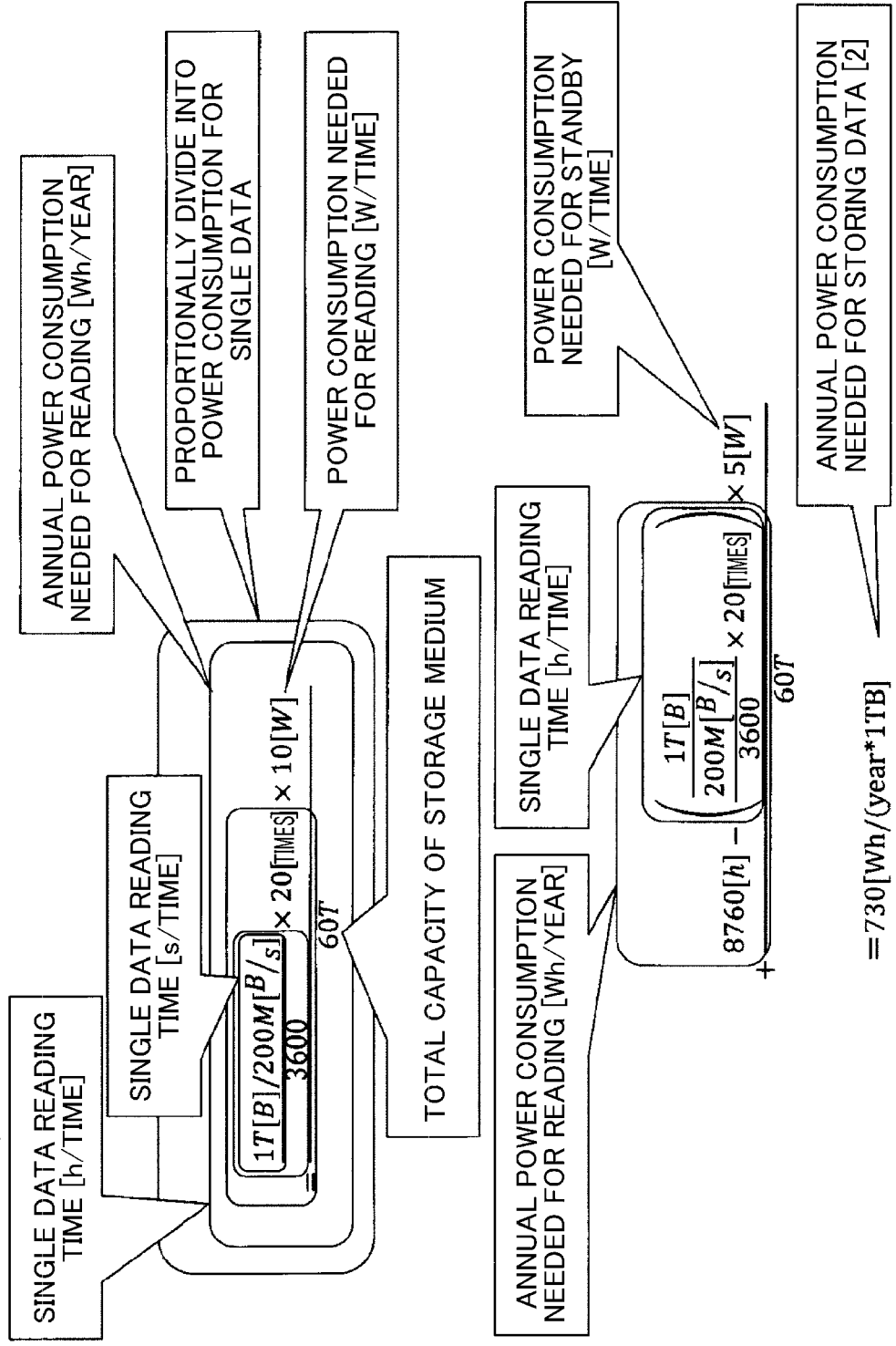
FIG. 18 is a diagram illustrating a calculation example.

The calculation unit 210 calculates the annual power consumption needed for storing the data of the data number "2" by using the formula (1). FIG. 18 illustrates the content of the calculation.

With regard to the data of the data number "2" stored in the storage medium of the storage medium number 11, $T_{read}$ (a single data reading time (h/time)) is (1 T[B]/200 M[B/s])=3600 based on FIG. 14. $F_{read}$ (annual reference frequency) is 20 times, $P_{read}$ (power consumption of a single reading of 60 T) is 10 [W], and the total capacity of the storage medium is 60 T. Therefore, $T_{read} \times F_{read} \times P_{read}$ (annual power consumption needed for reading) is ((1 T[B]/200 M[B/s])/3600)×20×10/60, as illustrated in FIG. 18.

Further, based on FIG. 14, since $P_{idle}$ (power consumption during standby) is 5 [W], the annual power consumption needed for standby is (8760−(((1 T[B]/200 M[B/s])/3600)× 20)×5=60, as illustrated in FIG. 18. The sum of the above resultant values is, as illustrated in FIG. 18, 730, which is the annual power consumption.

Further, the calculation unit 210 calculates the annual cost needed for storing the data of the data number "2" by using the formula (2). FIG. 19 illustrates the content of the calculation in detail.

Since $Charge_{power}$ (electricity charge) is 20 [yen/Wh], $PU_{year} \times Charge_{power} = 730 \times 20 = 14600$ [yen].

In the present example, since $Charge_{foorprint}$ (space cost) is 2,000,000/2, and $Density_{storage}$ (storage medium recording density) is 60 T, $(Charge_{foorprint} \times Size_{data}) \div Density_{storage} = 2,000,000/2 \times 1/60 = 16667$ [yen].

Further, since $Charge_{media}$ (unit price of the storage medium)=5,000,000, $Capacity_{media}$ (capacity of the storage medium)=60, and $Lifetime_{media}$ (lifetime of the storage medium)=4, $(Charge_{media} \times Size_{data}) \div (Capacity_{media} \times Lifetime_{media}) = 5,000,000 \times 1/(60 \times 4) = 20833$ [yen].

Therefore, by summing up these resultant values, $C_{year}$=52100 [yen] is obtained.

Figure 20:
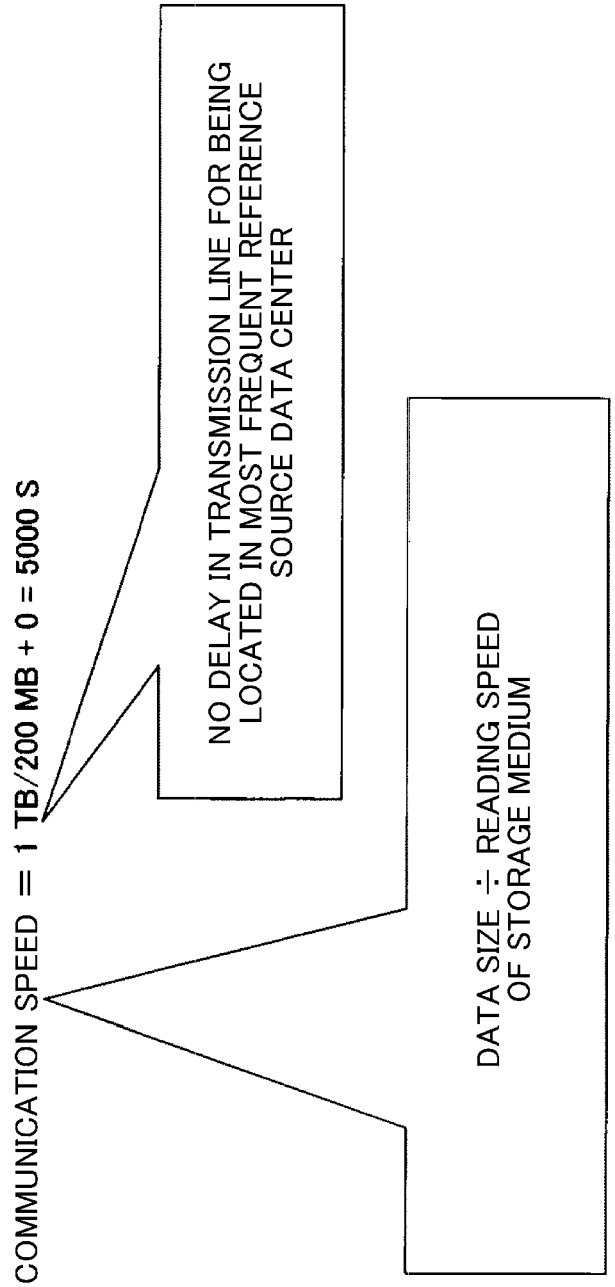
FIG. 20 is a diagram illustrating a calculation example.

Further, the calculation unit 210 calculates the communication speed (communication time) from the data center storing the data to the most frequent reference source area by using the formula (3). FIG. 20 illustrates the details.

In the present example, Since $T_{read}$ (reading time)=1 TB/200 MB, and $T_1$ (communication time of the NW)=0, $T_{DL}$=5000 S.

The calculation unit 210 stores the annual power consumption, the annual cost, and the communication speed from the corresponding data center to the most frequent reference source area, which have been calculated as described above, in the stored data management table 2270. FIG. 21 illustrates the portion of the data number 2 in the stored data management table 2270 after the above calculation results have been stored.

The calculation unit 210 acquires the communication speed, the power consumption, and the cost corresponding to the policy number "4" set for the data of the data number 2 from the operation policy table 2260. The calculation unit 210 compares these acquired values with the communication speed, the power consumption, and the cost calculated above.

Since the communication speed, the power consumption, and the cost all exceed the threshold values of the policy number "4", the calculation unit 210 determines that the storage medium HDD "11" currently storing the data does not satisfy the operation policy. Thus, the calculation unit 210 changes the storage medium and performs the calculation, and the calculation is continued until the values are within the range of the policy number "4".

Effects of the Embodiment

According to the technique in the present embodiment described above, when certain data is stored in any one of the plurality of data centers, the data center and the type of storage medium can be automatically selected for the data to be stored in accordance with the communication speed between the data centers and the power consumption and the cost needed for storing the data set in advance by the business operator. As a result, the power consumption and the cost can be reduced, and this leads to reductions of the electricity charge and environmental load as well as an improvement in QoS.

SUMMARY OF THE EMBODIMENT

The present description discloses at least the hierarchical storage management system, the hierarchical storage control apparatus, the hierarchical storage management method, and the program in the following items.

(Item 1)

A hierarchical storage management system, including: a hierarchical storage that is provided in an individual data center and has at least one storage medium; and a hierarchical storage control apparatus that manages at least one hierarchical storage, wherein the hierarchical storage control apparatus includes a calculation unit that performs processing for obtaining, for individual data managed by the hierarchical storage control apparatus, a storage medium in a data center that satisfies an operation policy by calculating power consumption needed for storing the data, a cost needed for storing the data, and communication time for transferring the data from a data center to a reference source area and by comparing the calculated power consumption, cost, and communication time with the operation policy set for the data.

(Item 2)

The hierarchical storage management system according to item 1, wherein, when the calculation unit determines that the calculated power consumption, cost, and communication time do not satisfy the operation policy set for the data, the calculation unit changes a storage medium storing the data and performs the processing on an assumption that the data is stored in a changed storage medium.

(Item 3)

The hierarchical storage management system according to item 1 or 2, wherein the calculation unit calculates power consumption needed for storing the data by calculating a sum of power consumption for data reading from the storage medium storing the data and power consumption during standby, calculates a cost needed for storing the data by calculating a sum of a cost of power consumption of the storage medium, a cost of installing the storage medium, and a cost of acquiring the storage medium, and calculates communication time for transferring the data from a data center to a reference source area based on a reading speed of the storage medium and a communication speed of a transmission line between the data center in which the storage medium is installed and the reference source area.

(Item 4)

A hierarchical storage management method used in a hierarchical storage management system including: a hierarchical storage that is provided in an individual data center and has at least one storage medium; and a hierarchical storage control apparatus that manages at least one hierarchical storage, wherein the hierarchical storage control apparatus performs processing for obtaining, for individual data managed by the hierarchical storage control apparatus, a storage medium in a data center that satisfies an operation policy by calculating power consumption needed for storing the data, a cost needed for storing the data, and communication time for transferring the data from a data center to a reference source area and by comparing the calculated power consumption, cost, and communication time with the operation policy set for the data.

(Item 5)

A hierarchical storage control apparatus used in a hierarchical storage management system including: a hierarchical storage that is provided in an individual data center and has at least one storage medium; and a hierarchical storage control apparatus that manages at least one hierarchical storage, wherein the hierarchical storage control apparatus includes a calculation unit that performs processing for obtaining, for individual data managed by the hierarchical storage control apparatus, a storage medium in a data center that satisfies an operation policy by calculating power consumption needed for storing the data, a cost needed for storing the data, and communication time for transferring the data from a data center to a reference source area and by comparing the calculated power consumption, cost, and communication time with the operation policy set for the data.

(Item 6)

A program that causes a computer to function as the calculation unit in the hierarchical storage control apparatus according to Item 5.

While the present embodiment has thus been described, the present invention is not limited to the above specific embodiment, and various variations and modifications may be made without departing from the scope of the present invention.

REFERENCE SIGNS LIST

10 Network
20 Hierarchical storage control apparatus
30 Data center
40 Hierarchical storage
50 User
210 Calculation unit
220 Storage unit
230 Timer
420 Storage medium
410 Storage unit
430 Management unit
2210 Data center information table
2220 Storage medium information table
2230 Transmission line information table
2240 Calculation interval table
2250 Execution log table
2260 Operation policy table
2270 Stored data management table
1000 Drive device
1001 Recording medium
1002 Auxiliary storage device
1003 Memory device
1004 CPU
1005 Interface device
1006 Display device
1007 Input device

The invention claimed is:

1. A hierarchical storage management system comprising: a hierarchical storage that is provided in an individual data center and has at least one storage medium; and a hierarchical storage control apparatus that manages at least one hierarchical storage for a plurality of data centers, wherein the hierarchical storage control apparatus is configured to:
for a plurality of stored data in each of the plurality of data centers:
obtain characteristics of the stored data;
determine a power consumption required for the stored data in a respective data center by calculating a sum of the power consumption by reading from the storage medium the stored data, power consumption during standby, annual data storage power consumption, a reading time for reading the stored data, and a frequency amount with which the stored data is annually access;
determine a cost required for the stored data in the respective data center;
determine a communication speed for transferring the stored data from the respective data center to a frequent device for downloading the stored data;
determine, for the stored data, whether (i) the power consumption, (ii) the cost required, and (iii) the communication speed, satisfy a policy from the obtained characteristics of the stored data, the policy describing criteria for data to be stored in the respective data center; and
in response to determining at least one of (i) the power consumption, (ii) the cost required, and (iii) the communication speed, does not satisfy the policy:
identify another data center of the plurality of data centers for storing the stored data from the respective data center;
determine, for the stored data, whether (i) the power consumption, (ii) the cost required, and (iii) the communication speed, satisfy another policy at the other data center, the other policy describing criteria for data to be stored in the other data center; and
in response to determining (i) the power consumption, (ii) the cost required, and (iii) the communication speed do satisfy the policy at the other data center, transmit the stored data from the respective data center to the other data center for storage.

2. The hierarchical storage management system according to claim 1, wherein the hierarchical storage control apparatus is configured to:
determine the cost required for the stored data in the respective data center by calculating a sum of a cost of power consumption of the storage medium, a cost of installing the storage medium, and a cost of acquiring the storage medium; and
determine the communication speed for transferring the stored data from the respective data center to a frequent device based on a reading speed of the storage medium of the respective data center and a communication speed of a transmission line between the respective data center in which the storage medium is installed and the frequent device.

3. The hierarchical storage management system according to claim 1, wherein the hierarchical storage control apparatus is configured to utilize an elapsed time of a timer to initiate processing for the plurality of stored data in each of the plurality of data centers.

4. The hierarchical storage management system according to claim 3, wherein the timer elapses on a monthly basis.

5. The hierarchical storage management system according to claim 1, wherein the hierarchical storage control apparatus is configured to:
in response to determining at least one of (i) the power consumption, (ii) the cost required, and (iii) the communication speed, does not satisfy the policy:
identify another storage medium at the respective data center for storing the stored data;
determine whether the power consumption, the cost required, and the communication speed for the stored data satisfies the policy at the other storage medium in the respective data center; and
in response to determining (i) the power consumption, (ii) the cost required, and (iii) the communication speed do satisfy the policy at the other storage medium in the respective data center, transmit the stored data from a first storage medium of the respective data center to the other storage medium of the respective data center.

6. A hierarchical storage management method used in a hierarchical storage management system comprising: a hierarchical storage that is provided in an individual data center and has at least one storage medium; and a hierarchical storage control apparatus that manages at least one hierarchical storage for a plurality of data centers, the method comprising:
for a plurality of stored data in each of the plurality of data centers:
obtaining characteristics of the stored data;
determining a power consumption required for the stored data in a respective data center by calculating a sum of the power consumption by reading from the storage medium the stored data, power consumption during standby, annual data storage power consumption, a reading time for reading the stored data, and a frequency amount with which the stored data is annually access;
determining a cost required for the stored data in the respective data center;
determining a communication speed for transferring the stored data from the respective data center to a frequent device for downloading the stored data;
determining, for the stored data, whether (i) the power consumption, (ii) the cost required, and (iii) the communication speed, satisfy a policy from the obtained characteristics of the stored data, the policy describing criteria for data to be stored in the respective data center; and
in response to determining at least one of (i) the power consumption, (ii) the cost required, and (iii) the communication speed, does not satisfy the policy:
identifying another data center of the plurality of data centers for storing the stored data from the respective data center;
determining, for the stored data, whether (i) the power consumption, (ii) the cost required, and (iii) the communication speed, for the stored data satisfies satisfy another policy at the other data center, the other policy describing criteria for data to be stored in the other data center; and
in response to determining (i) the power consumption, (ii) the cost required, and (iii) the communication speed do satisfy the other policy at the other data center, transmitting the stored data from the respective data center to the other data center for storage.

7. The hierarchical storage management method according to claim 6, comprising:
determining the cost required for the stored data in the respective data center by calculating a sum of a cost of power consumption of the storage medium, a cost of installing the storage medium, and a cost of acquiring the storage medium; and
determining the communication speed for transferring the stored data from the respective data center to a frequent device based on a reading speed of the storage medium of the respective data center and a communication speed of a transmission line between the respective data center in which the storage medium is installed and the frequent device.

8. A hierarchical storage control apparatus used in a hierarchical storage management system comprising: a hierarchical storage that is provided in an individual data center and has at least one storage medium; and a hierarchical storage control apparatus that manages at least one hierarchical storage for a plurality of data centers, wherein the hierarchical storage control apparatus is configured to:
for a plurality of stored data in each of the plurality of data centers:
obtain characteristics of the stored data;
determine a power consumption required for the stored data in a respective data center by calculating a sum of the power consumption by reading from the storage medium the stored data, power consumption during standby, annual data storage power consumption, a reading time for reading the stored data, and a frequency amount with which the stored data is annually access;
determine a cost required for the stored data in the respective data center;
determine a communication speed for transferring the stored data from the respective data center to a frequent device for downloading the stored data;
determine, for the stored data, whether (i) the power consumption, (ii) the cost required, and (iii) the communication speed, satisfy a policy from the obtained characteristics of the stored data, the policy describing criteria for data to be stored in the respective data center; and
in response to determining at least one of (i) the power consumption, (ii) the cost required, and (iii) the communication speed, does not satisfy the policy:
identify another data center of the plurality of data centers for storing the stored data from the respective data center;
determine, for the stored data, whether (i) the power consumption, (ii) the cost required, and (iii) the communication speed, satisfy another policy at the other data center, the other policy describing criteria for data to be stored in the other data center; and
in response to determining (i) the power consumption, (ii) the cost required, and (iii) the communication speed do satisfy the other policy at the other data center, transmit the stored data from the respective data center to the other data center for storage.

9. The hierarchical storage control apparatus according to claim 8, wherein the hierarchical storage control apparatus is configured to:
determine the cost required for the stored data in the respective data center by calculating a sum of power consumption of the storage medium, a cost of installing the storage medium, and a cost of acquiring the storage medium; and determine the communication speed for transferring the stored data from the respective data center to a frequent device based on a reading speed of the storage medium of the respective data center and a communication speed of a transmission line between the respective data center in which the storage medium is installed and the frequent device.

\* \* \* \* \*